United States Patent
Herring, Jr. et al.

(10) Patent No.: US 6,696,147 B1
(45) Date of Patent: Feb. 24, 2004

(54) BEADED ADHESIVE AND FLANGED PART MADE THEREFROM

(75) Inventors: James Morton Herring, Jr., Rochester Hills, MI (US); Bruce Norman Greve, Davisburg, MI (US)

(73) Assignee: ThyssenKrupp Budd Company, Troy, MI (US)

( * ) Notice: Subject to any disclaimer, the term of this patent is extended or adjusted under 35 U.S.C. 154(b) by 0 days.

(21) Appl. No.: 09/708,121

(22) Filed: Nov. 7, 2000

Related U.S. Application Data

(63) Continuation of application No. 08/911,810, filed on Aug. 15, 1997, now Pat. No. 6,180,199, which is a continuation of application No. 08/486,694, filed on Jun. 7, 1995, now Pat. No. 5,783,298, which is a continuation of application No. 08/195,746, filed on Feb. 14, 1994, now Pat. No. 5,470,416, which is a continuation of application No. 07/869,649, filed on Apr. 16, 1992, now abandoned.

(51) Int. Cl.[7] .................................................. B32B 5/16
(52) U.S. Cl. ........................... 428/323; 428/44; 428/49; 428/325; 428/327; 428/407; 524/494
(58) Field of Search ................................ 428/323, 327, 428/407, 44, 49, 325; 524/494

(56) References Cited

U.S. PATENT DOCUMENTS

| 1,960,042 A | 5/1934 | Andrus |
| 2,821,890 A | 2/1958 | Wilson ....................... 118/310 |

(List continued on next page.)

FOREIGN PATENT DOCUMENTS

| EP | 80304151.6 | 6/1981 | |
| EP | 0289632 | 9/1988 | |
| FR | 1540878 | 9/1968 | |
| FR | 2100142 | 3/1972 | |
| GB | 2063269 | 6/1981 | |
| JP | 49-30259 | 8/1974 | ................. 156/276 |
| JP | 135430 | 6/1986 | ................. 156/216 |

OTHER PUBLICATIONS

English translation of French Patent No. 2,100,142 (previously provided).
English translation of French Patent No. 1,540,878 (previously provided).
Clark, "Tapes and Structural Bonding Reduce Radar Unit Cost", *Adhesives Age*, Jun. 1991, pp. 28–34.
Elber, "Putting adhesives in their place", *Plastics Design Forum*, Sep./Oct. 1993, pp. 40–44.
Berins, *SPI Plastics Engineering Handbook*, Society of the Plastics Industry, Inc., 18 pages, 1991.
"Metal to Metal Overlap Shear Strength Test for Automotive Type Adhesives", SAE J1523, Jun. 1985.

*Primary Examiner*—H. Thi Le
(74) *Attorney, Agent, or Firm*—Harness, Dickey & Pierce, P.L.C.

(57) ABSTRACT

A method for adhesively joining two members includes the steps of mixing non-compressible beads with an adhesive, applying the resulting mixture to one of the members and hemming one member over the other in overlapping relationship. Apparatus for performing this method includes a container for containing a mixture of an adhesive and a plurality of non-compressible beads, an applicator for applying the mixture to one of the members, and hemming means for hemming one member over the other in overlapping relationship. A metering device for dispensing adhesive fluid is constructed with a dispensing rod having a cooling means for facilitating operation of the metering device. The present invention finds particular utility in bonding together the inner and outer panels of an automotive door assembly.

4 Claims, 5 Drawing Sheets

U.S. PATENT DOCUMENTS

| | | | |
|---|---|---|---|
| 3,279,972 A | 10/1966 | Thassy | |
| 3,551,232 A | 12/1970 | Thompson | 156/330 |
| 3,554,449 A | 1/1971 | Curie | 222/146 |
| 3,692,341 A | 9/1972 | Brown | |
| 3,700,514 A | 10/1972 | Zito | |
| 3,770,546 A | 11/1973 | Childress et al. | 156/285 |
| 3,773,098 A | 11/1973 | Rock | |
| 3,828,515 A | 8/1974 | Galgoczy | |
| 3,909,918 A | 10/1975 | Takizawa et al. | |
| 3,918,218 A | 11/1975 | Zoiss | |
| 4,008,845 A | 2/1977 | Bleckmann | |
| 4,131,980 A | 1/1979 | Zinnbauer | |
| 4,243,575 A | 1/1981 | Meyers et al. | |
| 4,353,951 A | 10/1982 | Yukitoshi et al. | 428/198 |
| 4,467,071 A | 8/1984 | Dawdy | 525/112 |
| 4,538,920 A | 9/1985 | Drake. | |
| 4,560,607 A | 12/1985 | Summer | |
| 4,749,833 A | 6/1988 | Novorsky et al. | 156/272.4 X |
| 4,761,440 A | 8/1988 | Laroche | |
| 4,769,419 A | 9/1988 | Dawdy | 525/111 |
| 4,770,585 A | 9/1988 | Astl | |
| 4,801,008 A | 1/1989 | Rich | |
| 4,866,108 A | 9/1989 | Vachon et al. | 523/428 |
| 4,882,367 A | 11/1989 | Laroche | |
| 4,916,284 A | 4/1990 | Petrick | 219/121.64 |
| 4,938,381 A | 7/1990 | Manderville et al. | |
| 4,971,859 A | 11/1990 | Kimura et al. | 428/325 |
| 5,008,304 A * | 4/1991 | Kmentt | 523/118 |
| 5,026,188 A | 6/1991 | Capodieci | |
| 5,080,493 A | 1/1992 | McKown et al. | |
| 5,237,734 A | 8/1993 | Polon | 29/513 |
| 5,332,125 A | 7/1994 | Schmitkons et al. | |
| 5,470,416 A * | 11/1995 | Herring, Jr. et al. | 156/196 |
| 5,487,803 A | 1/1996 | Sweeney | |
| 5,515,596 A | 5/1996 | Saijo et al. | |
| 5,632,413 A | 5/1997 | Herring, Jr. et al. | |
| 5,633,085 A | 5/1997 | Schleifstein | |
| 5,783,298 A * | 7/1998 | Herring, Jr. et al. | 428/323 |
| 5,798,185 A | 8/1998 | Kato | |
| 6,180,199 B1 * | 1/2001 | Herring, Jr. et al. | 428/44 |

\* cited by examiner

BEADED ADHESIVE AND FLANGED PART MADE THEREFROM

CROSS-REFERENCE TO RELATED APPLICATIONS

This application is a continuation of prior application Serial No. 08/911,810 filed Aug. 15, 1997, now U.S. Pat. No. 6,180,199 which is a continuation of prior application Serial No. 08/486,694 filed Jun. 7, 1995, now U.S. Pat. No. 5,783,298; which is a continuation of prior application Serial No. 08/195,746 filed Feb. 14, 1994, now U.S. Patent No. 5,470,416; which is a continuation of prior application Serial No. 07/869,649 filed Apr. 16, 1992, now abandoned; which applications are herein expressly incorporated by reference.

BACKGROUND OF THE INVENTION

1. Technical Field

This invention relates to adhesively bonding at least two members and, more particularly, to joining at least two members with a mixture of an adhesive and non-compressible beads.

2. Discussion

FIGS. 1 through 4 show a method of making a hemmed joint for inner and outer sheet metal door panels. FIG. 1 shows a first member 10, a second member 12, and an amount of adhesive 14 which has been applied to second member 12. In FIG. 2, first member 10 has been placed into proximity with second member 12, and first and second members 10,12 have been squeezed together. The area where first and second members 10,12 overlap defines an adhesive joint 15. Adhesive 14 has spread throughout the area of joint 15. FIG. 2 further shows a hemming die 18 which is pressed downward to bend a portion of second member 12 into overlapping relationship with first member 10. In FIG. 3, a second hemming die 20 is shown completing the hem by further folding down a portion of second member 12 to overlap first member 10, such that a hemmed portion 22 of second member 12 is parallel with the portions of first and second members 10,12 in the area of joint 15. Quite often, adhesive 23 is squeezed out of the area of joint 15 as a result of completion of the hemming operation. This squeezed-out adhesive 23 is unsightly and often requires removal in an additional manufacturing step where aesthetics is important, such as in the making of an automobile door where inner and outer panels are hemmed together.

Following formation of the hemmed joint 15, the first and second members 10,12 tend to elastically relax and "spring back" toward their original positions. FIG. 4 shows joint 15 subsequent to this "spring back" phenomenon, which tends to create an air-filled gap 26 between adhesive material 14 and first member 10. Air-filled gap 26 results because adhesive 14 has been squeezed out of joint 15 and an insufficient amount remains to fill the void created by the "spring back" of first and second members 10,12. This air-filled gap 26 reduces the area of joint 15, resulting in a weakened joint.

SUMMARY OF THE INVENTION

The present invention provides a method and apparatus for adhesively joining at least two members in which a plurality of non-compressible beads are mixed with the adhesive, and one of the members is folded into overlapping relationship with the other in a hemming operation. The beads may be added to the adhesive in a preselected substantially uniform concentration. The apparatus for performing this method includes a container for containing a mixture of an adhesive and a plurality of non-compressible beads. An application gun applies this mixture to at least one of the members to be joined. A pump is employed for pumping the bead and adhesive mixture from the container through the application gun onto at least one of the members. A hemmer then hems one member into overlapping relationship with another.

The present invention further provides a metering device having an improved displacement rod which includes a cooling means for cooling the rod and preventing the adhesive fluid from hardening, thus facilitating insertion of the displacement rod into the metering chamber.

BRIEF DESCRIPTION OF THE DRAWINGS

The various advantages and features will become apparent from the following description and claims in conjunction with the accompanying drawings:

DETAILED DESCRIPTION OF THE PREFERRED EMBODIMENT

The following description of the preferred embodiments is merely exemplary in nature and is in no way intended to limit the invention or its application or uses.

Figure 1:
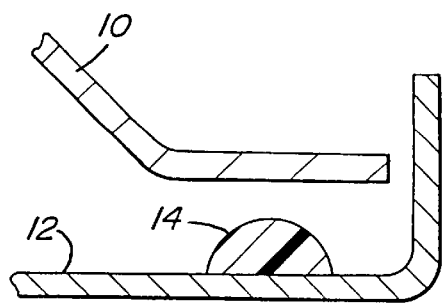
FIGS. 1 through 4 are sectional views showing steps in making a hemmed adhesive joint which illustrate the problem solved by the present invention.
Figure 2:
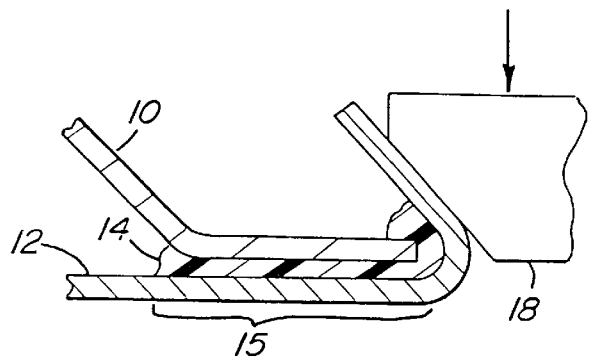
Figure 3:
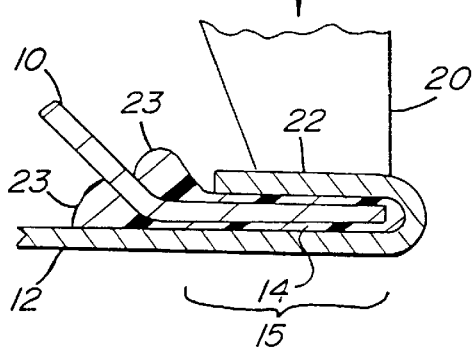
Figure 4:
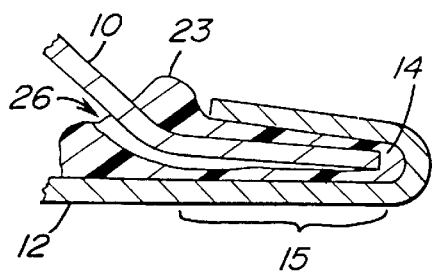
Figure 5:
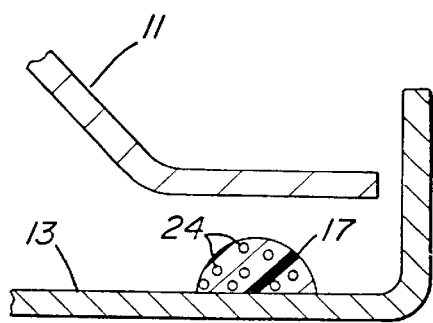
FIGS. 5 through 8 are sectional views of a hemmed adhesive joint formed according to the principles of the present invention.
Figure 6:
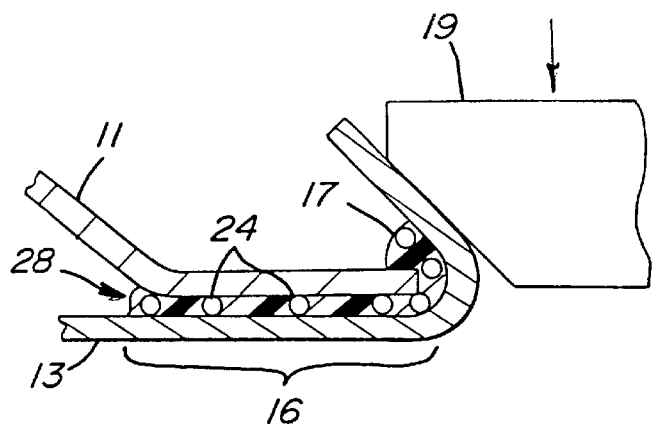
Figure 7:
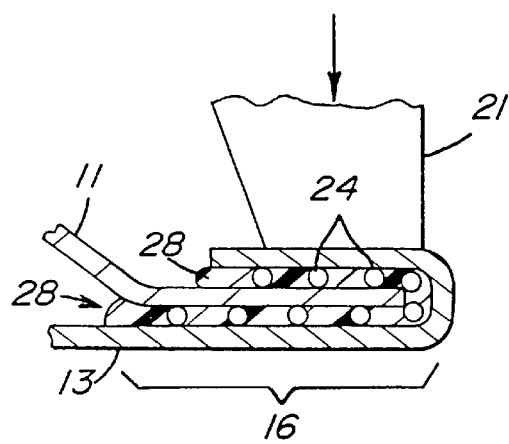

Referring to the drawings, in which like reference numerals refer to similar features, FIGS. 5 through 8 show a method of joining a first and second member 11,13 according to the present invention. By way of a non-limiting example, the first and second members 11,13 are edges of inner and outer sheet metal automobile door panels. FIG. 5 shows first member 11, second member 13, and an amount of adhesive 17 which has been mixed with a plurality of non-compressible beads 24, and this mixture has been applied to second member 13. In FIG. 6, first and second members 11,13 have been squeezed together to form a joint 16, which has caused the adhesive 17 and bead 24 mixture to spread throughout the area of joint 16. The non-compressible beads 24 maintain a specific distance 28 between the portions of first and second members 11,13 in the area of joint 16. Hemming die 19 is shown folding a portion of second member 13 over a portion of first member 11. FIG. 7 shows the joint 16 following completion of the hemming operation by second hemming die 21. The non-compressible beads 24 prevent an excess amount of adhesive 17 from being squeezed out of the area of joint 16 and maintain the predetermined distance 28 between first and second members 11,13 throughout all the areas of joint 16. The joint 16 does not require additional processing to remove the unacceptable squeezed-out adhesive as in the aforementioned prior art technique.

Figure 8:
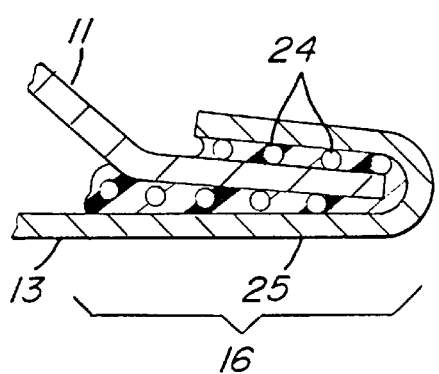

FIG. 8 shows joint 16 following plastic relaxation of first and second members 11,13 toward their original positions. Because beads 24 ensure that most of adhesive 17 remains in the area of joint 16, the joint 16 created by a method of the present invention tends to maintain its integrity and prevent creation of an air-filled gap in the area of joint 16, resulting in a stronger bond between first and second members 11,13.

The beads 24 need not be spherical, although a spherical shape is preferable. Beads 24 are preferably made of glass and should be mixed with adhesive 17 in a concentration which is sufficiently high to prevent beads 24 from becoming partially embedded in the surfaces of the members 11,13 during the hemming operation, and should not show "read through" to the outer panel surface 25. "Read through" is defined as an imperfect, uneven or bumpy outer surface 25 of second member 13. The concentration of beads 24 in adhesive 14 should also be sufficiently low to provide a strong joint and not to damage apparatus for handling and pumping the bead and adhesive mixture. The adhesive in mixture 17 is preferably a blend of a two component acrylic/epoxy adhesive, such as Versilok 252 and Versilok 254 available from Lord Corporation. The concentration of beads 24 in the mixture range from about 5% to about 20% of the total weight of the mixture and about 10% by weight is preferable, which results in approximately 1000 beads per square inch of the adhesive mixture in the final joint.

The beads 24 should preferably be made having a diameter sufficiently low to provide a strong joint and sufficiently high such that the beads 24 are effective spacers, without showing "read through" to the outer panel. Acceptable diameters for the beads 24 range from 0.003 to 0.030 inches, and 0.010 inches is preferable.

Figure 9:
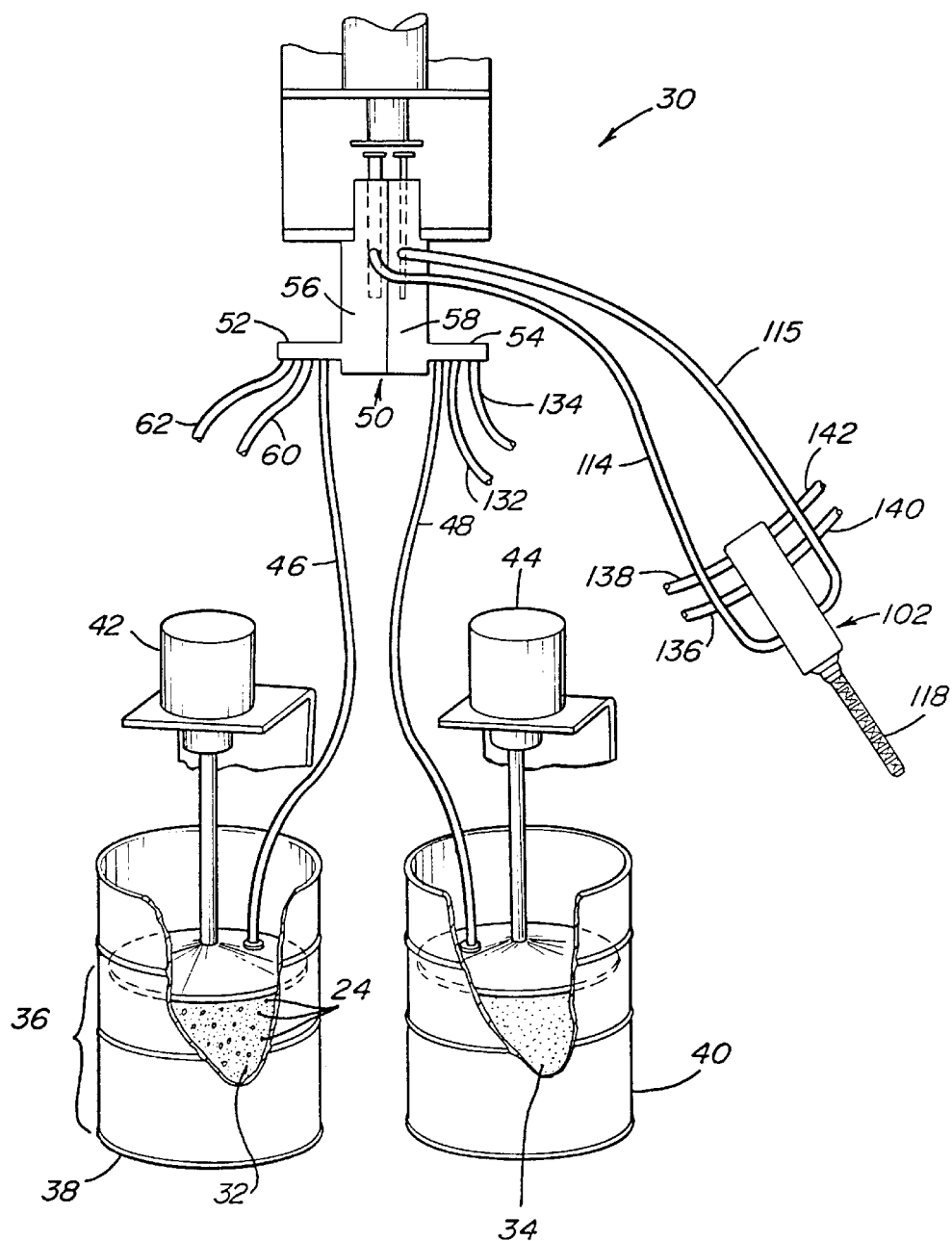
FIG. 9 is a perspective and partial cut-away view of an apparatus according to the principles of the present invention.

FIG. 9 depicts apparatus 30 for forming an adhesive bond according to the method of the present invention. In the embodiment of FIG. 9, the adhesive is a two part adhesive consisting of a first component 32 and a second component 34. The present invention may also be practiced with a one component adhesive. The proper amount of beads 24 are mixed in container 38 with the first component 32 to achieve the aforementioned concentration. The first component 32, in this particular example, is Versilok 252 which contains acrylic and an epoxy curative. (Second component 34 contains epoxy resin and an acrylic curative). Beads 24 are mixed with first component 32 because it is more thixotropic than second component 34, thereby keeping the beads in suspension for longer periods of time. It is the understanding of the inventors that a pre-mixed bead/adhesive mixture is now available from Lord Corporation as Versilok 253. A second container 40 substantially similar to first container 38 contains second component 34. First and second containers 38,40 are preferably 55 gallon drums, as used in the art. First and second pumps 42,44 pump the first mixture 36 of first component 32 and beads 34 as well as the second component 34 from first and second containers 38,40 respectively. First mixture 36 is pumped through a first supply tube 46 into a first metering chamber 56 of a metering device 50 through a first inlet valve 52. Second component 34 is pumped through a second supply tube 48 into a second metering chamber 58 of metering device 50 through a second inlet valve 54.

A first and second valve member (not shown) are operated by compressed air tubes 60,62 and 132, 134. The operation of first and second valve 52,54 by compressed air tubes 60,62 and 132, 134 respectively will be explained below. First mixture 36 and second component 34 are then displaced from first and second metering chambers 56,58 through exit valves (not shown) identical to inlet valves 52, 54 and then into application tubes 114, 115 into an adhesive application gun 102 which is shown in greater detail in FIG. 12. Adhesive gun 102 has left and right halves (not shown) each containing a valve (not shown) operated by compressed air tubes 136,138 and 140,142. Adhesive materials exit adhesive gun 102 and are mixed in an elongated mixing nozzle 118 and the resulting mixture is applied to a member 11,13 to be adhesively joined.

Figure 10:
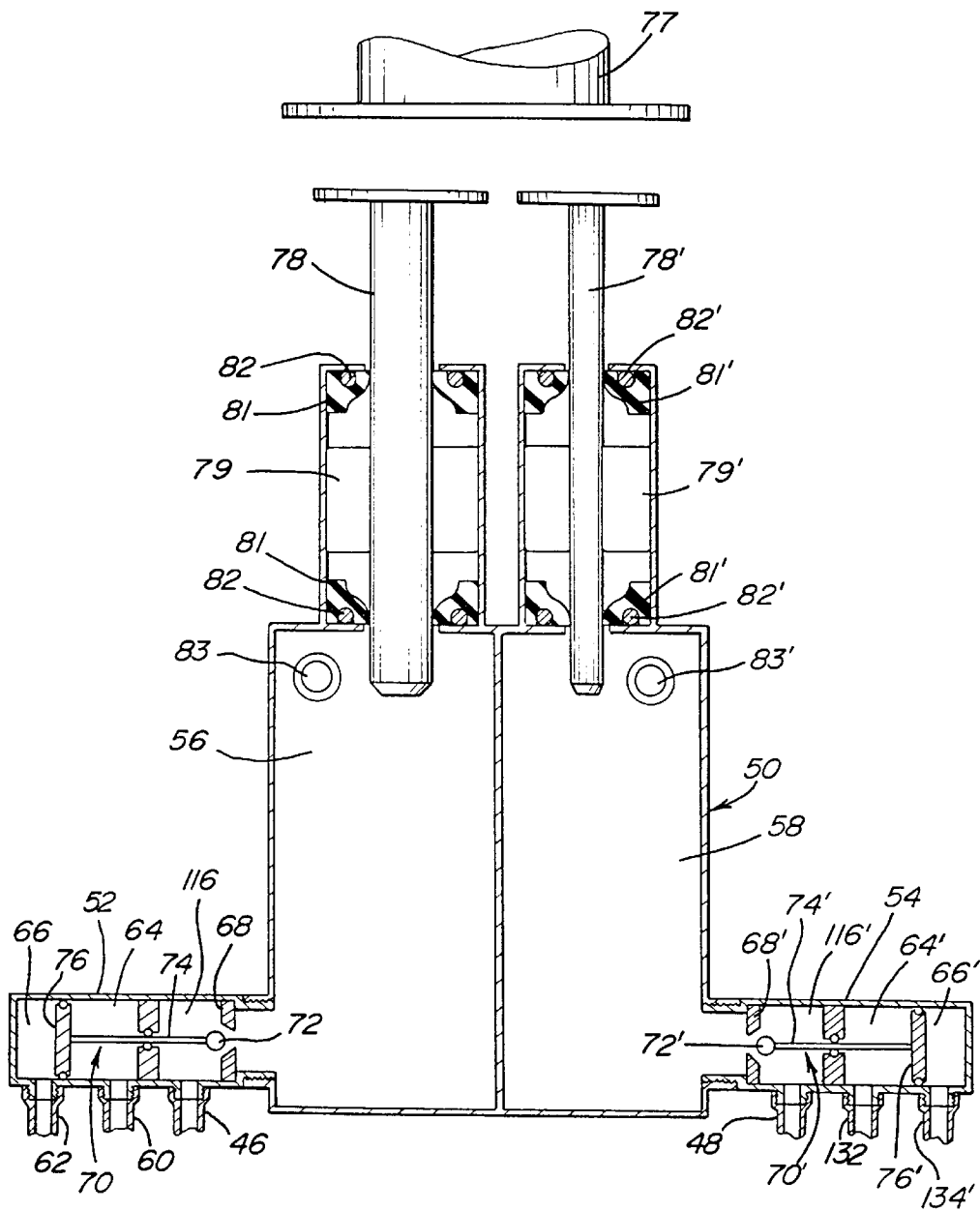
FIG. 10 is a cut-away view of a metering device according to the principles of the present invention.

Adhesive materials consisting of first mixture 36 and second component 34 flow through first and second valves 52,54 into a metering device 50 which is shown in greater detail in FIG. 10. Metering device 50 defines a first and a second metering chamber 56,58. The first mixture 36 is pumped into first metering chamber 56 and second component 34 is pumped into second metering chamber 58, with the exit valves being closed. The force of the fluids being pumped into the metering chambers causes rods 78, 78' to be pushed upwardly. First and second valves 52,54 then close, preventing flow of first mixture 36 or second component 34.

First and second valves 52,54 are constructed substantially similarly having a valve seat 68,68' and a valve member 70,70' consisting of a spherical valve plug 72,72' connected to a longitudinally extending valve shaft 74,74' which is in turn connected to a plate-shaped piston member 76,76'. Inlet tubes 46,48 are connected to first and second valve 52,54 and allow fluid to enter valve chambers 116, 116'. Compressed air hoses 60,62 and 132,134 are also connected to first and second valves 52,54.

Valve members 70,70' are moved between open and closed positions by creating a pressure differential across pistons 76,76'. To close the valve, the pressure in valve opening chamber 64,64' is alleviated, and compressed air is forced into the closing chamber 66,66' by closing compressed air tube 62,134 to increase the pressure therein. The resulting difference in pressure across piston 76,76' causes the valve shaft 74,74' to move axially and press spherical valve plug 72,72' into place against the valve seat 68,68'. To open valve, the pressures in opening and closing chambers 64,66 and 64',66' are reversed. When first and second valves 52,54 are open, first mixture 36 and second component 34 which are under pressure due to first and second pumps 42,44 enter first and second metering chambers 56,58 through valve chambers 116,116' and from inlet tubes 46,48.

Valve plug 72,72' must make full circular contact with valve seat 68,68' to completely shut off flow. As a result, valve plug 72 and seat 68 are made of a material sufficiently strong to resist damage by beads 24, or strong enough to repeatedly crush any glass beads 24 without damage. As a result, valve plug 72 and seat 68 are preferably constructed of tungsten carbide or hardened steel. The same is true of the exit valve (not shown) which is connected to chamber 56.

Metering device 50 further has a first and second displacement rod 78,78' which are assembled through a bearing 79,79' and opposing seals 81,81' formed with O-rings 82,82' to retain them in place. Displacement rod 78 is preferably made of hardened steel to prevent damage by the beads. Displacement rods 78,78' are adapted to be forced into first and second chamber 56,58 respectively, and thereby to displace first mixture 36 as well as second component 34 from first and second chamber 56,58. As a result, first mixture 36 and second component 34 are forced by displacement rods 78,78' through outlets 83,83' and through a first and second application tube 114,115 into an application gun 102 and a mixing nozzle 118 which combines first mixture 36 and second component 34 into a second mixture of component 32, second component 34, and beads 24. Gun 102 is used to apply second mixture to a member 11,13 to form an adhesive joint 16 according to the present invention. Rods 78, 78' have different but constant cross-sections throughout their longitudinal lengths. Accordingly, rods 78, 78' force a preselected volume flow ratio of first mixture 36 and second component 34 out of outlets 83 and 83', respectively, in the proper proportion substantially equivalent to the cross-sectional ratio of the diameter of rod 78 to rod 78' when they are moved downwardly by power head 77.

Figure 11:
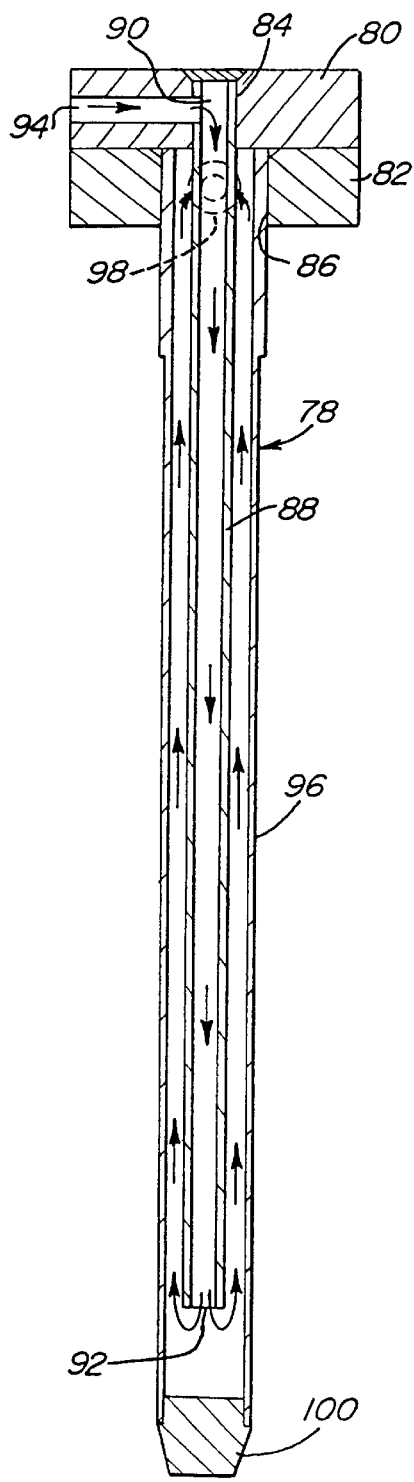
FIG. 11 is a cut-away view of a displacement rod according to the principles of the present invention.

FIG. 11 depicts displacement rod 78 as having a cooling system to prevent partial polymerization or hardening of the adhesive fluid located near the juncture of the rod 78 and housing of metering device 50 at the seal 81. The displacement rod 78 is constructed of an upper and lower head block 80,82 which are each formed with vertical bores 84,86. The bore 84 formed in upper head block 80 has a smaller diameter than bore 86 formed in lower head block 82. Bore 84 formed in upper head block 80 carries the upper end of an inner flow tube 88 which has an inlet 90 and an outlet 92. Upper head block 80 is formed with a horizontally extending inlet passage 94 which opens into the inlet 90 of inner flow' tube 88. Bore 86 formed in lower head block 82 carries the upper end of a displacement tube 96 which has an outlet 98 at one end and a cap 100 at the other end which allows no fluid communication. Inner flow tube 88 extends throughout a majority of the length of displacement tube 78.

In operation of the displacement rod 78 cooling system, cooling fluid such as water enters and flows through inlet passage 94 to inlet 90 of inner flow tube 88 as shown by the arrows in FIG. 11. Coolant fluid flows through inner flow tube 88 and exits through outlet 92. Coolant fluid undergoes a flow reversal and proceeds upward through a gap 101 formed between the outer surface of inner flow tube 88 and the inner surface of displacement tube 96 and exits displacement rod 78 through outlet 98.

Figure 12:
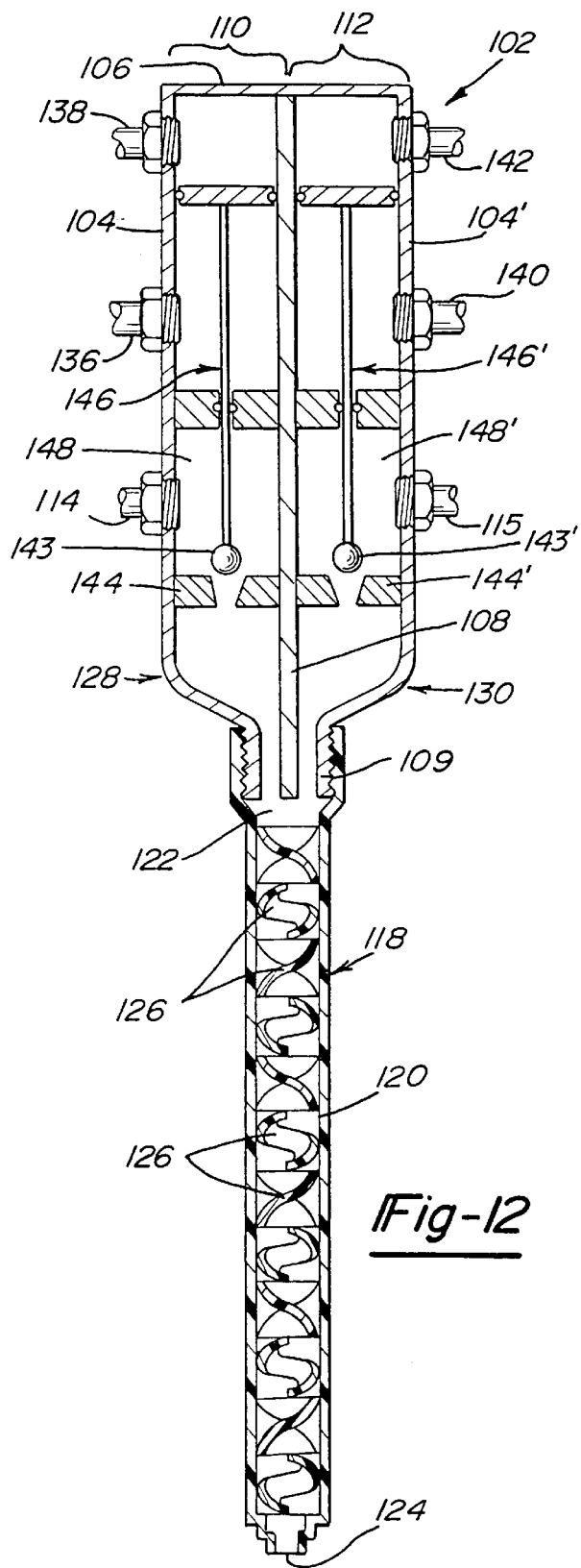
FIG. 12 is a cut-away view of an adhesive application gun according to the principles of the present invention.

FIG. 12 shows the adhesive application gun 102. Adhesive gun 102 is formed with side walls 104,104', a rear panel 106, a central longitudinally extending partition 108, and a front nozzle portion 109. Central partition 108 defines left and right symmetrical halves 110,112 of adhesive gun 102. Each half 110,112 of adhesive gun 102 includes similar valves 128,130 constructed substantially similar to first and second inlet valves 52,54 and have a valve seat 144,144', valve plug 143,143' valve member 146,146', and application inlet tubes 114,115 which allow fluid to enter valve chambers 148,148'. Valve seat 144 and plug 143 are made of tungsten carbide or other hardened materials to reduce bead damage. Compressed air hoses 136,138 and 140,142 operate valves 128,130 as described above. When the valves 128, 130 are open, adhesive fluid under pressure due to displacement rods 78,78' enters valve chambers 148,148' through fluid inlet hoses 114,115 and proceeds out of adhesive gun 102 through nozzle 109.

An elongated mixing nozzle 118 is affixed to and extends from nozzle 109 formed on adhesive gun 102. Mixing nozzle 118 is formed as an elongated tube 120 having an inlet 122 and an outlet 124 and contains a plurality of helical mixing elements 126. The adjacent ends of successive helical elements 126 should not be aligned so that the adhesive fluids entering left and right sides 110,112 of adhesive gun 102 are thoroughly mixed. The resulting mixture exits mixing nozzle 118 through outlet 124. Because first component 32 and second component 34 are mixed within mixing nozzle 118, mixing nozzle 118 should be unscrewed and flushed or purged of old adhesive materials approximately every 15 to 20 minutes to prevent polymerization.

Hemming apparatus as known in the art is used to fold one member 10 into overlapping relationship with a second member 12. Hemming means preferably should apply local pressures in the range of 2000 to 10,000 pounds per square inch, but should be at least 1000 pounds per square inch. A typical hemming machine is commercially available from E. R. St. Dennis & Sons Ltd. of Old Castle, Ontario, Canada.

It should be understood that various modifications of the preferred embodiments of the present invention will become apparent to those skilled in the art after a study of the specification, drawings, and the following claims.

What is claimed is:

1. An adhesive for bonding two structural members which are hem flanged together to form a joint, said adhesive comprising:

a mixture of an adhesive fluid and a plurality of beads premixed with the adhesive fluid; the mixture of adhesive fluid and beads enabled to be pumped from at least one container through a dispensing device and applied onto a surface of one of the members prior to being hem flanged under pressure with the other member, the beads having compression characteristics such that they can withstand the applied pressure so as to maintain a gap between the members to prevent squeeze out of the adhesive so that an effective amount of the adhesive remains present within the joint to form a strong bond therebetween to prevent separation of the members, and the concentration of beads minimizing read through to the outer surface of a member after the members are hem flanged together.

2. An adhesive mixture for bonding two structural members which are hem flanged together to form a joint, said adhesive comprising:

a mixture of an adhesive fluid and a plurality of beads premixed with the adhesive fluid in a container, the mixture being one part of a two part adhesive which is mixed with a second part and applied to a surface of one of the members prior to being hem flanged under pressure with the other member to form a joint therebetween, the adhesive in the joint having a concentration of beads in the range of up to about 20% by weight, the beads having compression characteristics such that they can withstand the applied pressure so as to maintain a gap between the members to prevent squeeze out of the adhesive so that an effective amount of the adhesive remains present within the joint to form a strong bond therebetween to prevent separation of the members.

3. A part comprising:

a first member;

a second member;

a hem flange connecting portions of the first and second member together; and an adhesive containing a plurality of beads in the joint between opposing faces of the first and second members; and the beads having compression characteristics such that they can withstand the applied pressure so as to maintain a gap between the members to prevent squeeze out of the adhesive so that an effective amount of the adhesive remains present within the joint to form a strong bond therebetween to prevent separation of the members.

4. A container having a mixture of adhesive and a plurality of beads therein, the concentration of beads being in the range of up to about 20% by weight, the beads having a diameter in the range of about 0.003 to about 0.030 inches, the mixture being capable of being pumped from the container and applied to a member prior to forming a joint with another member where the members are pressed together with a force of at least about 2000 psi, the beads having compression characteristics such that they can withstand the applied pressure so as to maintain a gap between the members to prevent squeeze out of the adhesive.

* * * * *